United States Patent
Santillan Gutierrez et al.

(10) Patent No.: US 10,436,233 B2
(45) Date of Patent: Oct. 8, 2019

(54) SPRING CLIP WITH FRANGIBLE FEATURES INDICATING CORRECT INSTALLATION

(71) Applicant: FORD GLOBAL TECHNOLOGIES, LLC, Dearborn, MI (US)

(72) Inventors: Diego Santillan Gutierrez, Tizayuca (MX); Alejandro Rosas Vazquez, Mexico City (MX); Fernando Paisano Rodriguez, San Andres Cholula (MX); Jezahel Lara Sandoval, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 15/697,951

(22) Filed: Sep. 7, 2017

(65) Prior Publication Data
US 2019/0072120 A1 Mar. 7, 2019

(51) Int. Cl.
F16B 2/22 (2006.01)
F16B 21/08 (2006.01)
F16B 5/12 (2006.01)
F16B 2/24 (2006.01)
F16B 5/06 (2006.01)

(52) U.S. Cl.
CPC .............. *F16B 2/22* (2013.01); *F16B 2/243* (2013.01); *F16B 5/065* (2013.01); *F16B 5/12* (2013.01); *F16B 21/086* (2013.01); *Y10T 24/30* (2015.01); *Y10T 24/309* (2015.01); *Y10T 24/44026* (2015.01)

(58) Field of Classification Search
CPC .. F16B 2/22; F16B 8/12; F16B 21/086; Y10T 24/49; Y10T 24/30; Y10T 24/303; Y10T 24/42; Y10T 24/309; Y10T 24/44026
See application file for complete search history.

(56) References Cited

U.S. PATENT DOCUMENTS

| | | | |
|---|---|---|---|
| 3,889,320 A | 6/1975 | Koscik | |
| 4,122,583 A * | 10/1978 | Grittner | B60R 13/0206 24/297 |
| 4,543,760 A | 10/1985 | Barker et al. | |
| 4,881,292 A | 11/1989 | Hoferer et al. | |
| 5,098,315 A | 3/1992 | Scowen | |
| 5,105,521 A | 4/1992 | Dowd et al. | |
| 5,579,616 A | 12/1996 | Farag | |
| 6,863,331 B2 | 3/2005 | Beaver et al. | |

(Continued)

FOREIGN PATENT DOCUMENTS

| | | |
|---|---|---|
| DE | 202005005068 U1 | 7/2005 |
| DE | 102011110124 B3 | 10/2012 |
| WO | 2009143250 A1 | 11/2009 |

OTHER PUBLICATIONS

English Machine Translation of DE102011110124B3.
English Machine Translation of DE202005005068U1.

*Primary Examiner* — Robert Sandy
*Assistant Examiner* — Michael S Lee
(74) *Attorney, Agent, or Firm* — Vichit Chea; King & Schickli, PLLC

(57) ABSTRACT

A spring clip includes a first frangible feature extending between a first cantilever bar and a support post and a second frangible feature extending between a second cantilever bar and the support post. The frangible features provide a readily perceived indication of proper spring clip installation.

20 Claims, 7 Drawing Sheets

(56) References Cited

U.S. PATENT DOCUMENTS

| | | |
|---|---|---|
| 6,874,756 B2 | 4/2005 | Hawkins et al. |
| 7,036,779 B2 | 5/2006 | Kawaguchi et al. |
| 7,152,281 B2 | 12/2006 | Scroggie |
| 7,320,157 B2 | 1/2008 | Lubera et al. |
| 7,351,023 B2 | 4/2008 | Scroggie et al. |
| 7,354,102 B2 | 4/2008 | Cave et al. |
| 7,496,993 B2 | 3/2009 | Kosidlo et al. |
| 7,854,780 B2 | 12/2010 | Hirsch |
| 8,298,308 B2 | 10/2012 | Li |
| 8,936,420 B2 | 1/2015 | Scroggie et al. |
| 8,979,460 B2 | 3/2015 | Ostergren |
| 9,079,341 B2 | 7/2015 | Risdale et al. |
| 9,121,426 B2 | 9/2015 | Jagoda |
| 2006/0230586 A1 | 10/2006 | Maki et al. |
| 2006/0231690 A1* | 10/2006 | Cooley ................ F16B 21/086 248/71 |
| 2007/0125004 A1 | 6/2007 | Conner et al. |
| 2008/0066266 A1 | 3/2008 | Scroggie et al. |
| 2012/0257924 A1 | 10/2012 | Andrews |
| 2013/0011188 A1* | 1/2013 | Donnelly ............. F16B 21/086 403/291 |

* cited by examiner

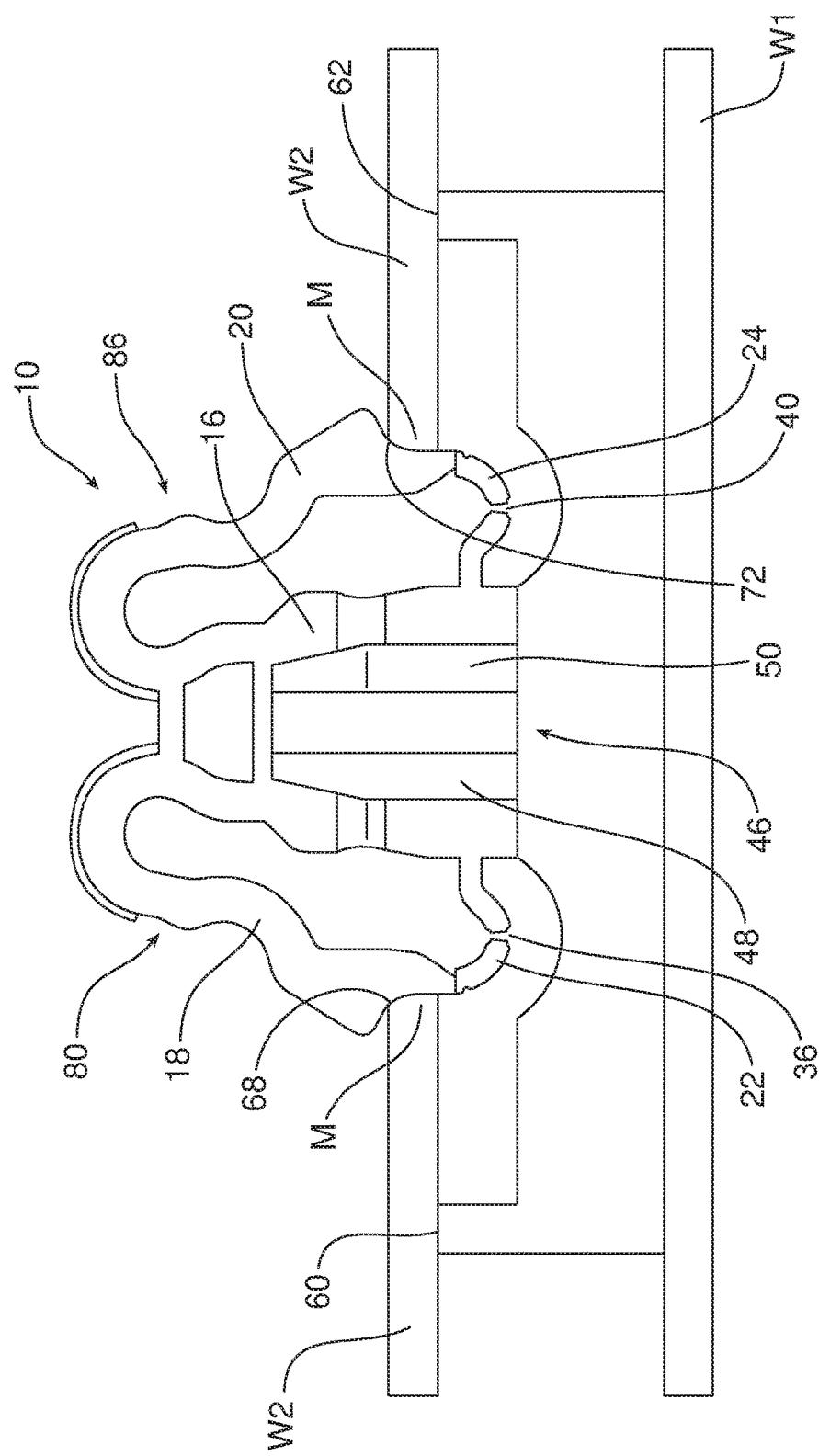

SPRING CLIP WITH FRANGIBLE FEATURES INDICATING CORRECT INSTALLATION

TECHNICAL FIELD

This document relates generally to the fastener field and, more particularly, to a new and improved W-shaped winged spring clip with frangible features that provide audible and effort feedback indicating correct installation.

BACKGROUND

Various types of fasteners including, for example, bolts/nuts, metal clips, plastic clips or the like may be utilized to secure a plastic part to a substrate such as a sheet metal part. Significantly, every added fastener increases the part cost and weight of the assembly. More specifically, fastener usage requires additional operations at the assembly plant or at the plastic part manufacturer and every additional operation increases the required manpower, process cost and production time. In addition, each fastener has a risk of producing squeaks and rattles. Further, added, separate fasteners have the risk of being missing or mismatched during assembly.

This document relates to a new and improved W-shaped winged spring clip with frangible features that provide a readily perceived indication that the fastener has been correctly installed. The spring clip eliminates the need for additional, separate fasteners thereby reducing the weight and cost of the assembly. It also provides a robust and stronger, more durable joint clamping between a plastic part and a sheet metal part while maintaining proper position and alignment through assembly and vehicle operation and substantially eliminating the risk of squeaks and rattles.

The spring clip also includes double blocked lateral wings or cantilever bars structured to dissipate stress concentrations as well as reinforcing ribs or gussets that add extra strength. Further, the spring clip has a low insertion effort and functions to locate, lock and retain parts together in a single snapping action.

SUMMARY

In accordance with the purposes and benefits described herein, a spring clip is provided. That spring clip comprises a body including a base, a support post carried on the base, a first cantilever bar carried on the support post and a second cantilever bar carried on the support post. The spring clip also includes a first frangible feature extending between the first cantilever bar and the support post. In addition the spring clip includes a second frangible feature extending between the second cantilever bar and the support post.

The first frangible feature may have a first end connected to the first cantilever bar and a second end connected to the support post. In addition, the second frangible feature may have a third end connected to the second cantilever bar and a fourth end connected to the support post.

A first engineered break point may be provided on the first frangible feature between the first end and the second end. Further, a second engineered break point may be provided on the first frangible feature between the first end and the second end. The first engineered break point may be provided adjacent the first end.

The spring clip may further include a third engineered break point on the second frangible feature between the third end and the fourth end. In addition, the spring clip may include a fourth engineered break point on the second frangible feature between the third end and the fourth end. Further, the third engineered break point may be provided adjacent the third end.

The spring clip may further include a first surface recess in the base aligned with the first frangible feature. Further, the spring clip may include a second surface recess in the base aligned with the second frangible feature.

The first cantilever bar of at least some of the many possible embodiments of the spring clip may include a first S-curve segment and the second cantilever bar may include a second S-curve segment. Further, at least some of the many possible embodiments of the spring clip may include a first tunable rib carried on the base adjacent a first distal end of the first cantilever bar. Similarly, such spring clip embodiments may also include a second tunable rib carried on the base adjacent a second distal end of the second cantilever bar.

Still further, the spring clip may include a four-way locator carried on the base on one side of the support post. That four-way locator may include a first beveled sidewall and a second beveled sidewall. The first beveled sidewall may have a first edge bevel and the second beveled sidewall may have a second edge bevel where the first edge bevel is aligned with the second edge bevel.

In the following description, there are shown and described several preferred embodiments of the spring clip. As it should be realized, the spring clip is capable of other, different embodiments and its several details are capable of modification in various, obvious aspects all without departing from the spring clip as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the spring clip and together with the description serve to explain certain principles thereof.

FIG. 1 is a perspective view of the W-shaped winged spring clip incorporating the first and second frangible features that allow one to quickly and easily perceive through audible and effort indications the correct installation of the spring clip.

FIGS. 2a-2c are a series of views that illustrate how a plastic part is secured to a workpiece utilizing the spring clip of FIG. 1. More specifically, FIG. 2a is a perspective view illustrating how the spring clip on the plastic part is aligned with a mounting aperture in a workpiece. FIG. 2b is a perspective view illustrating the inward deflection of the cantilever bars of the spring clip as the spring clip is inserted into the mounting aperture. FIG. 2c is a side elevation view of the spring clip once the connection has been completed.

Figure 1:
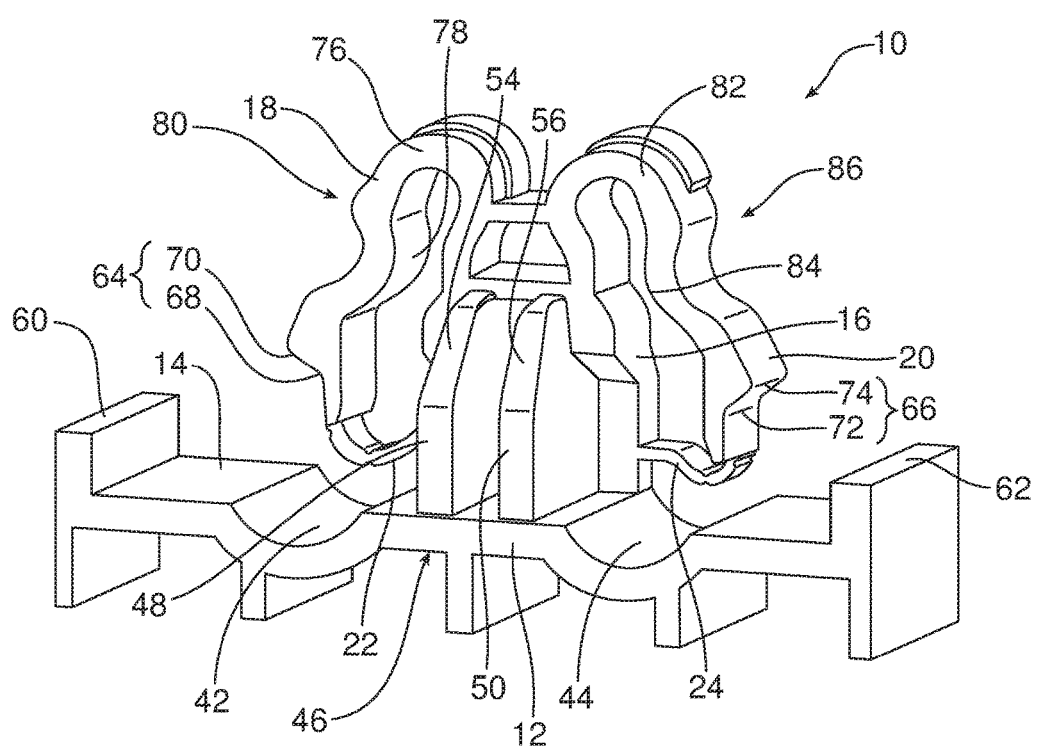

Reference will now be made in detail to the present preferred embodiments of the spring clip, examples of which are illustrated in the accompanying drawing figures.

DETAILED DESCRIPTION

Reference is now made to FIGS. 1, 2a-2c, 3a and 3b illustrating the spring clip 10. The spring clip 10 includes a body 12 having a base 14 and a support post 16 carried on the base. A first cantilever bar 18 is carried on the support post 16. A second cantilever bar 20 is also carried on the support post 16. In the illustrated embodiment, the first cantilever bar 18 is oriented so as to be opposed to the second cantilever bar 20.

A first frangible feature 22 extends between the first cantilever bar 18 and the support post 16. A second frangible feature 24 extends between the second cantilever bar 20 and the support post 16.

Figure 3A:
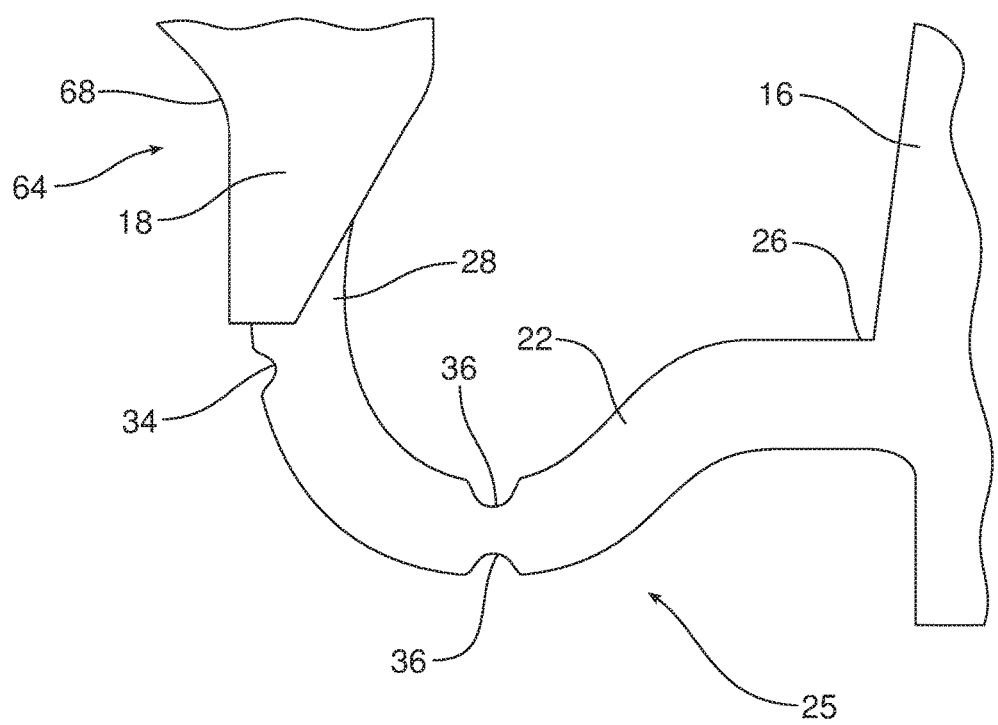
FIGS. 3a and 3b are respective, detailed elevational views illustrating the two engineered break points on (a) the first frangible feature between the support post and the first cantilever bar and (b) the second frangible feature between the support post and the second cantilever bar.

More specifically as best illustrated in FIG. 3a, the first frangible feature 22 may take the form of a thin strip of material having a first end 26 connected to the first cantilever bar 18 and a second end 28 connected to the support post 16. The first frangible feature 22 includes a first engineered break point 34 provided adjacent the first end 26 and a second engineered break point 36 between the first engineered break point and the second end 28. In the illustrated embodiment, the first engineered break point 34 is a notch formed or cut into the wall of the first frangible feature while the second engineered break point 36 is two opposed notches formed or cut into the wall of the first frangible feature.

Figure 3B:
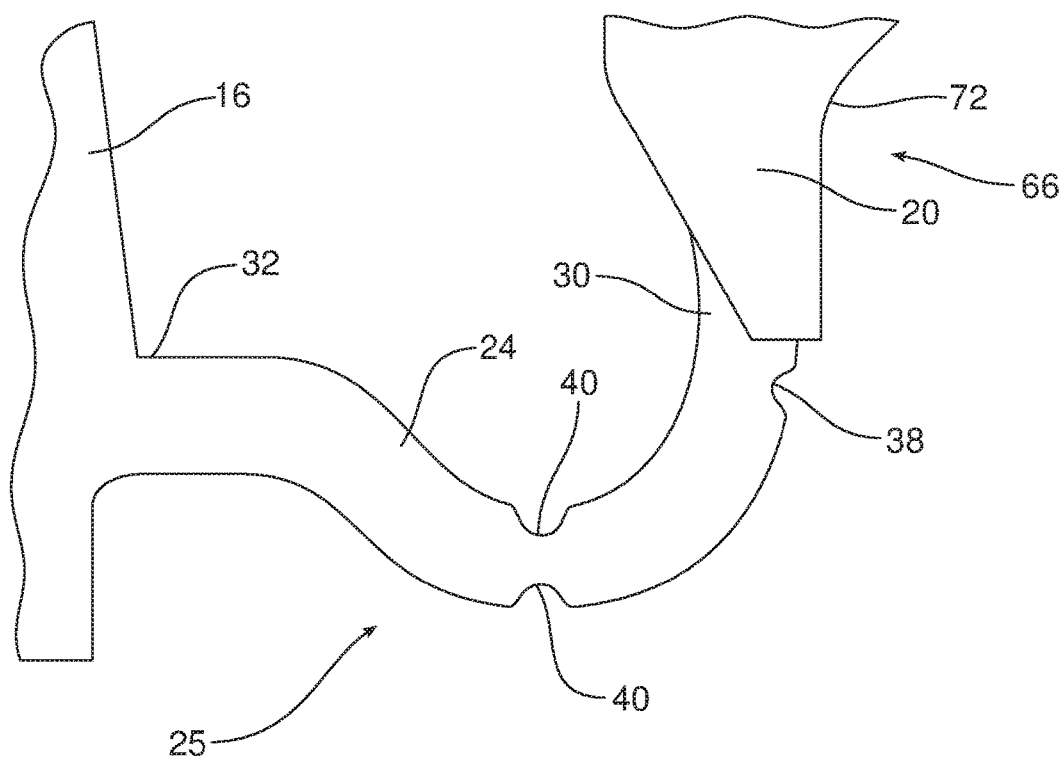

Similarly as best illustrated in FIG. 3b, the second frangible feature 24 may take the form of a thin strip of material having a third end 30 connected to the second cantilever bar 20 and a fourth end 32 connected to the support post 16. The second frangible feature 24 includes a third engineered break point 38 provided adjacent the third end 30 and a fourth engineered break point 40 between the third engineered break point and the fourth end 32. In the illustrated embodiment, the third engineered break point 38 is a notch formed in the wall of the second frangible feature 24 while the fourth engineered break point 40 is two opposed notches formed or cut into the wall of the second frangible feature. Both frangible features 22, 24 include S-curves 25.

As further illustrated in FIG. 1, a first surface recess or concavity 42 is provided in the base 14 aligned with or juxtaposed to the first frangible feature 22. Similarly, a second surface recess or concavity 44 is provided in the base 14 aligned with or juxtaposed to the second frangible feature 24.

In addition, the body 12 includes a four-way locator 46 which is fixed to the base 14 on one side of the support post 16. The body 12 and the first and second frangible features 22, 24 may be molded from a single piece of plastic or composite material so that the base 14, support post 16, first cantilever bar 18, second cantilever bar 20, first frangible feature 22, second frangible feature 24 and four-way locator 46 are integral with one another.

As best illustrated in FIG. 1, the four-way locator 46 includes a first beveled sidewall 48 and a second beveled sidewall 50. As clearly illustrated in FIG. 1, the first beveled sidewall 48 has a first edge bevel 54 and the second beveled sidewall 50 has a second edge bevel 56. In the illustrated embodiment the first edge bevel 54 and the second edge bevel 56 are aligned.

As best illustrated in FIG. 1, the base 14 includes a first tunable rib 60 that is carried on the base adjacent a first distal end of the first cantilever bar 18 and a second tunable rib 62 carried on the base adjacent a second distal end of the second cantilever bar 20.

As further illustrated in FIGS. 1 and 3a, the first distal end of the first cantilever bar 18 includes a first double blocked notch 64. Similarly, the second distal end of the second cantilever bar 20 includes a second double blocked notch 66. The first double blocked notch 64 includes a first midpoint angle 68 and a first radiused face 70 so that the first double blocked notch 64 has a substantially V-shape. Similarly, the second double blocked notch 66 includes a second midpoint angle 72 and a second radiused face 74 so that the second double blocked notch 66 is a substantially V-shaped configuration.

As best illustrated in FIG. 1, the first cantilever bar 18 includes a first bend 76 adjacent the support post 16. The first cantilever bar 18 forms a first neck 78 with the support post 16. The first bend 76 and the first neck 78 define a first S-curve segment 80 that distributes stress over a larger area and functions to dissipate any stress concentration.

Similarly, the second cantilever bar 20 includes a second bend 82 adjacent the support post 16. Further, the second cantilever bar 20 forms a second neck 84 with the support post 16. The second bend 82 and the second neck 84 define a second S-curve segment 86 that distributes stress over a larger area and functions to dissipate any stress concentration.

Figure 2A:
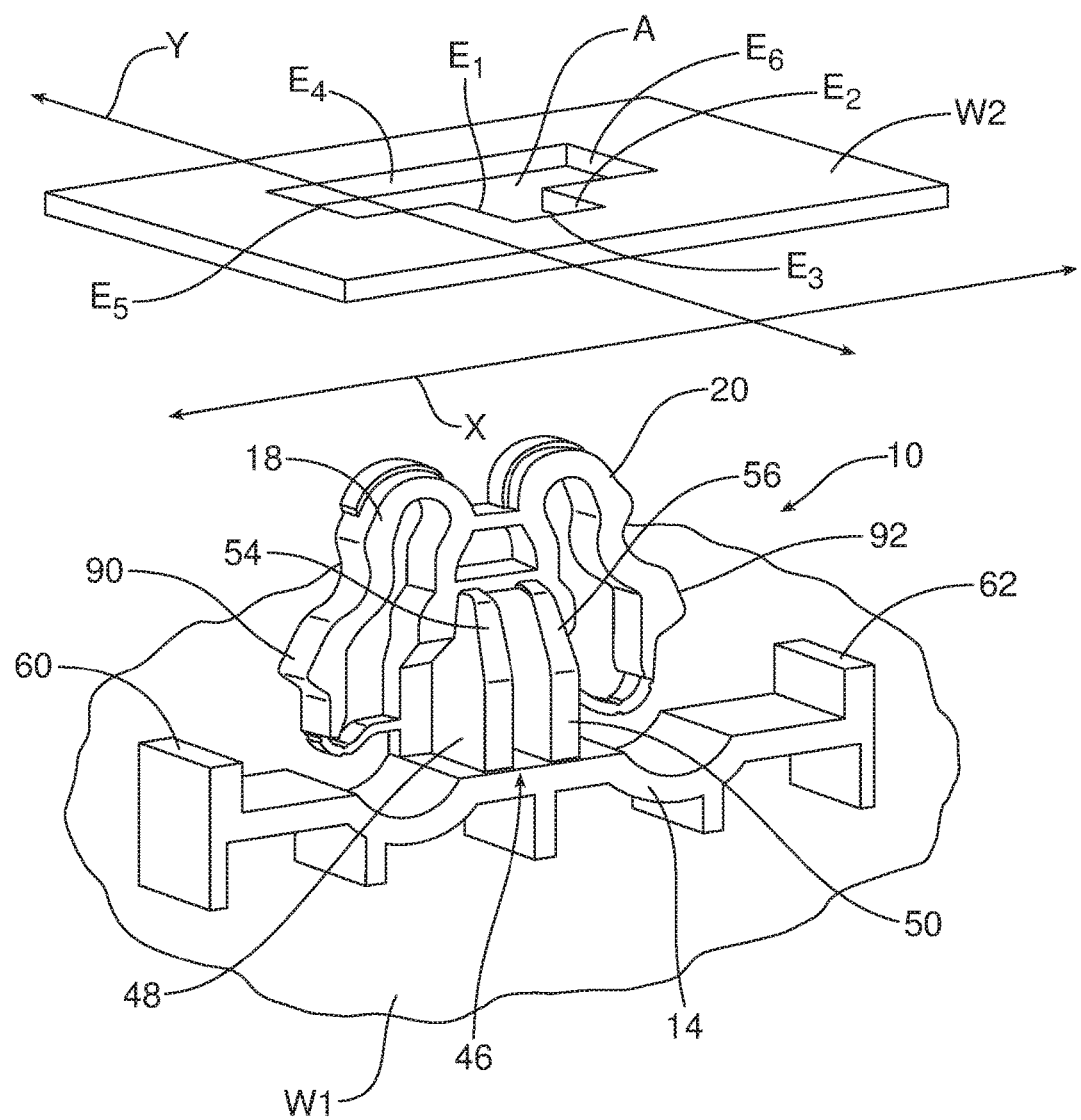

In the embodiment illustrated in FIG. 2a, the spring clip 10 is integrally molded as a part of the plastic workpiece W1. When one wishes to connect the plastic workpiece W1 to the sheet metal component W2, one aligns the top of the body 12 with the mounting aperture A in the sheet metal component. The mounting aperture A is substantially T-shaped. As the spring clip 10 is inserted into the mounting aperture A the four-way locator 46 ensures proper alignment and orientation of the plastic workpiece W1 with the sheet metal component W2. More specifically, the first beveled sidewall 48 and the second beveled sidewall 50 engage the edges E1, E2 of the aperture A ensuring proper orientation along the X axis. At the same time, the first edge bevel 54 and the second edge bevel 56 of the first beveled sidewall 48 and second beveled sidewall 50 engage the edge E3 of the aperture A and the face of the support post 16 opposite the four-way locator 46 engages the edge E4 of the aperture to ensure proper orientation along the Y axis thereby providing full 4-way locator function. (See also FIG. 2b).

As the spring clip 10 is further inserted into the aperture A, the cam surface 90 of the first cantilever bar 18 engages the edge E5 of the aperture A while the cam surface 92 on the second cantilever bar 20 engages the edge E6 of the aperture A. This causes the resilient first cantilever bar 18 and resilient second cantilever bar 20 to flex about the respective first bend 76 and second bend 82 and pivot inwardly toward the support post 16. Just as the first tunable rib 60 and the second tunable rib 62 come into contact with the face of the sheet metal component W2, the cam faces of 90, 92 clear the sheet metal component W2 and the first and second cantilever bars 18, 20 spring outwardly away from the support post 16 about the first and second bends 76, 82 with the sheet metal component W2 being now received and fully seated in the first and second double blocked notches 64, 66.

As the cantilever bars 18, 20 are first bent toward and then away from the support post 16 during this installation process, the two frangible features 22, 24 are also bent first one way and then the other. This causes the two frangible features 22, 24 to break. More specifically, the first frangible feature 22 breaks at the first engineered break point 34 and/or the second engineered break point 36. The second frangible feature 24 breaks at the third engineered break point 38 and/or the fourth engineered break point 40.

When the frangible features 22, 24 break, they provide an audible click and a change in insertion effort that clearly indicates to the installer that the spring clip 10 is fully inserted into the aperture A and the plastic workpiece W1 is properly installed on the sheet metal component W2.

As should be appreciated, in the fully seated position shown in FIG. 2c, the margin M of the sheet metal component W2 provided around the aperture A is effectively captured between the first cantilever bar 18 and second cantilever bar 20 on one side and the support edges of the tunable ribs 60, 62 on the other. It should be appreciated that the height of the ribs 60 and 62 may be adjusted or tuned in order to provide a good, rattle free connection between the workpiece W1 and the sheet metal component W2.

Should it ever become necessary to disconnect the workpiece W1 from the sheet metal component W2 for service or any other reason, it is possible to pry the workpiece W1 away from the sheet metal component and overcome the resilient holding power of the spring clip 10. When this is done, the ends E3, E4 of the mounting aperture A slide up the radiused faces of the notches 64, 66 causing the two cantilever bars 18, 20 to bend slightly inward toward the support post 16 until the aperture is free of the notches to allow easy separation. The four-way locator 46 ensures that the cantilever bars 18, 20 always work in a normal direction to any load being applied to the spring clip 10 thereby protecting those bars from inadvertent damage during assembly and disassembly.

Numerous benefits and advantages are provided by the spring clip 10. The spring clip 10 includes frangible features 22, 24 that rupture during the installation process and provide audible and effort feedback respecting correct installation of the spring clip. The spring clip 10 insures a strong, durable and rattle free connection while minimizing weight and reducing costs.

Figure 4:
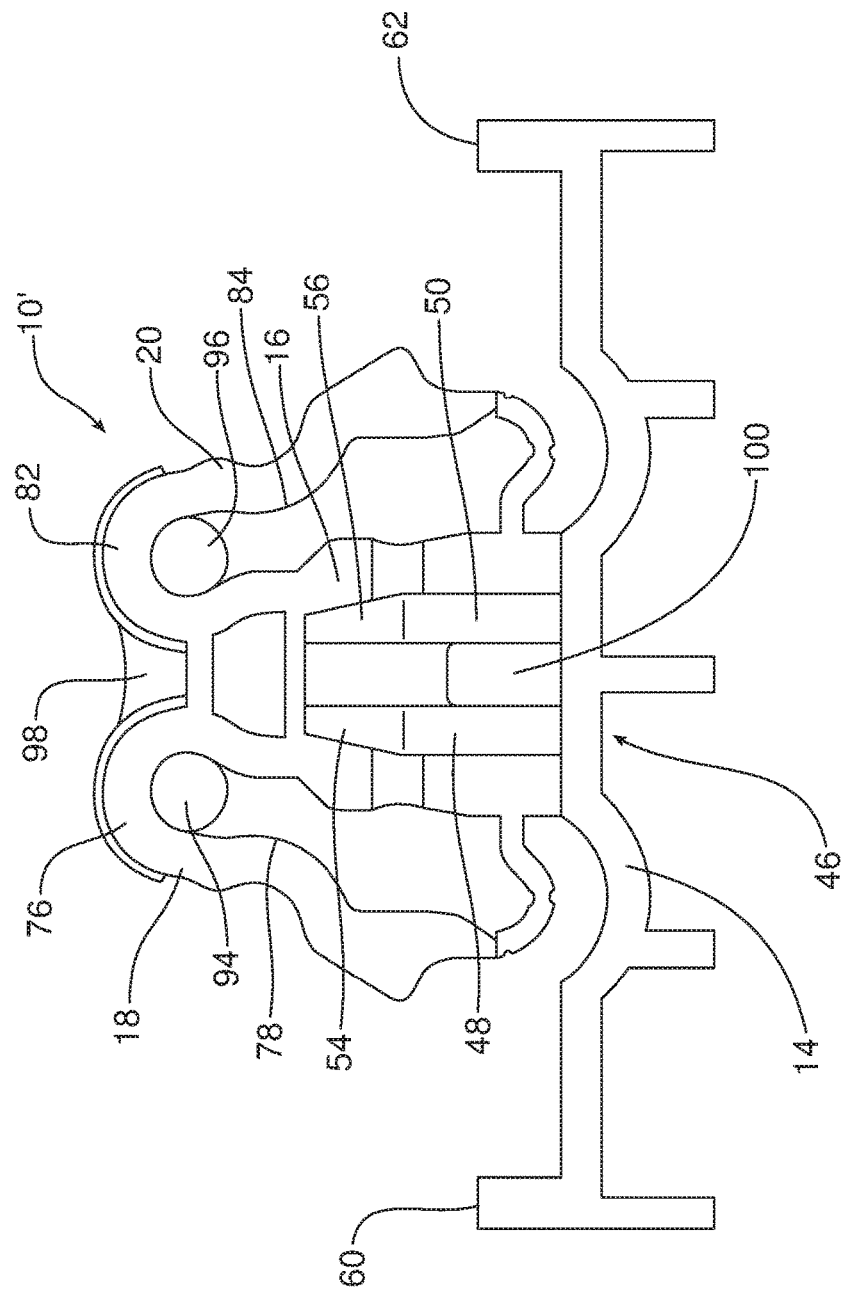
FIG. 4 is a side elevational view of an alternative embodiment of W-shaped winged spring clip including reinforcing gussets and a third tunable rib.

In an alternative embodiment of spring clip 10' illustrated in FIG. 4, a first gusset 94 extends inside the first bend 76 between the support post 16 and the first cantilever bar 18 inside the first neck 78. A second gusset 96 extends inside the second bend 82 between the support post 16 and the second cantilever bar 20 inside the second neck 84.

As further illustrated in FIG. 4, a third gusset 98 extends outside the first bend 76 and the second bend 82 between the first cantilever bar 18, the second cantilever bar 20 and the support post 16. As should be appreciated, the first gusset 94, the second gusset 96 and the third gusset 98 are not as thick as the first cantilever bar 18, the second cantilever bar 20 and the support post 16 and, therefore, have a smaller cross-sectional area. As a result, while the first gusset 94 and third gusset 98 increase the strength of the first cantilever bar 18 and the second gusset 96 and the third gusset 98 increase the strength of the second cantilever bar 20, the gussets still allow for the necessary bending and flexing of the first and second cantilever bars to allow the spring clip 10 to be used as a resilient connector or fastener between a workpiece W1 and a sheet metal body component W2. (See FIGS. 2a-2c).

Figure 2B:
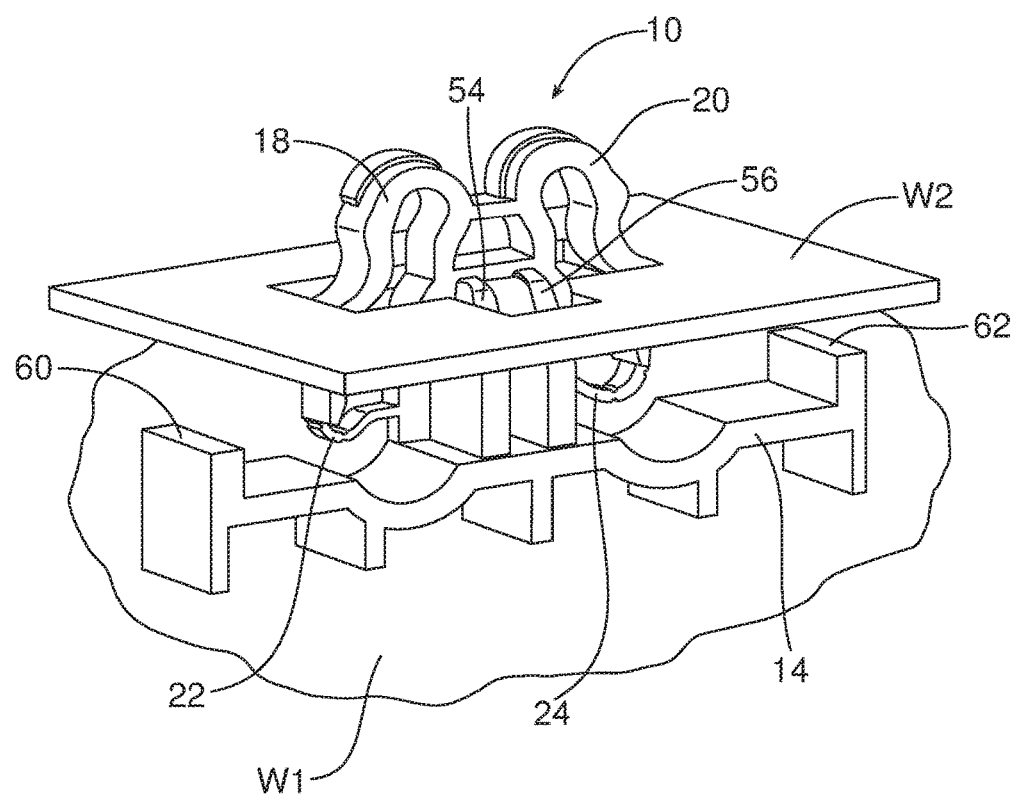

The spring clip 10' may also include a third tunable rib 100 between the first beveled sidewall 48 and the second beveled sidewall 50. That tunable rib 100 projects outwardly from the beveled sidewalls 48, 50 and away from the support post 16. The height of all three tunable ribs 60, 62, 100 may be tuned as necessary to insure proper fit and finish when the spring clip is used to connect the plastic workpiece W1 to the sheet metal component W2 as illustrated in FIGS. 2a-2c.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A spring clip, comprising:
   a body including a base, a support post carried on said base, a first cantilever bar carried on said support post and a second cantilever bar carried on said support post;
   a first frangible feature extending between said first cantilever bar and said support post, said first frangible feature including a first engineered break point and a second engineered break point; and
   a second frangible feature extending between said second cantilever bar and said support post wherein said second frangible feature includes a third engineered break point and a fourth engineered break point and said first frangible feature and said second frangible feature are engineered to break in order to give an indication when said spring clip is properly installed in a workpiece.

2. The spring clip of claim 1, wherein said first frangible feature has a first end connected to said first cantilever bar and a second end connected to said support post.

3. The spring clip of claim 2, wherein said second frangible feature has a third end connected to said second cantilever bar and a fourth end connected to said support post.

4. The spring clip of claim 3, wherein said first engineered break point is on said first frangible feature between said first end and said second end.

5. The spring clip of claim 4, wherein said second engineered break point is on said first frangible feature between said first end and said second end, said first engineered break point being provided adjacent said first end.

6. The spring clip of claim 5, wherein said third engineered break point on said second frangible feature is between said third end and said fourth end.

7. The spring clip of claim 6, wherein said fourth engineered break point is on said second frangible feature between said third end and said fourth end, said third engineered break point being provided adjacent said third end.

8. The spring clip of claim 7, further including a first surface recess in said base aligned with said first frangible feature.

9. The spring clip of claim 8, further including a second surface recess in said base aligned with said second frangible feature.

10. The spring clip of claim 1, wherein said first cantilever bar includes a first S-curve segment and said second cantilever bar includes a second S-curve segment.

11. The spring clip of claim 1, further including a first tunable rib carried on said base adjacent a first distal end of said first cantilever bar.

12. The spring clip of claim 11, further including a second tunable rib carried on said base adjacent a second distal end of said second cantilever bar.

13. The spring clip of claim 12, further including a four-way locator carried on said base on one side of said support post.

14. The spring clip of claim 13, wherein said four-way locator includes a first beveled sidewall.

15. The spring clip of claim 14, wherein said four-way locator includes a second beveled sidewall.

16. The spring clip of claim 15, wherein said first beveled sidewall has a first edge bevel and said second beveled sidewall has a second edge bevel wherein said first edge bevel is aligned with said second edge bevel.

17. The spring clip of claim 16, wherein said first cantilever bar includes a first S-curve segment and said second cantilever bar includes a second S-curve segment.

18. The spring clip of claim 1, further including a first tunable rib on said base adjacent a first distal end of said first cantilever bar and a second tunable rib on said base adjacent a second distal end of said second cantilever bar.

19. The spring clip of claim 1, further including a four-way locator carried on said base on one side of said post.

20. The spring clip of claim 19, wherein said four-way locator includes a first beveled sidewall and a second beveled sidewall.

\* \* \* \* \*